United States Patent
Gupta et al.

(10) Patent No.: US 9,912,474 B2
(45) Date of Patent: Mar. 6, 2018

(54) PERFORMING TELEMETRY, DATA GATHERING, AND FAILURE ISOLATION USING NON-VOLATILE MEMORY

(71) Applicant: Intel Corporation, Santa Clara, CA (US)

(72) Inventors: Saurabh Gupta, Tacoma, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 263 days.

(21) Appl. No.: 14/040,026

(22) Filed: Sep. 27, 2013

(65) Prior Publication Data

US 2015/0095644 A1    Apr. 2, 2015

(51) Int. Cl.

| | |
|---|---|
| H04L 9/32 | (2006.01) |
| H04L 9/08 | (2006.01) |
| G06F 21/78 | (2013.01) |
| G06F 1/32 | (2006.01) |
| G06F 21/80 | (2013.01) |
| H04L 9/12 | (2006.01) |
| G06F 3/06 | (2006.01) |

(52) U.S. Cl.
CPC .......... *H04L 9/0825* (2013.01); *G06F 1/3203* (2013.01); *G06F 1/3206* (2013.01); *G06F 3/0601* (2013.01); *G06F 21/78* (2013.01); *G06F 21/80* (2013.01); *G06F 21/805* (2013.01); *H04L 9/12* (2013.01); *H04L 9/32* (2013.01)

(58) Field of Classification Search
CPC . H04L 9/12; H04L 9/32; G06F 1/3203; G06F 1/3206; G06F 21/78; G06F 21/80; G06F 21/805; G06F 3/0601
See application file for complete search history.

(56) References Cited

U.S. PATENT DOCUMENTS

| | | | |
|---|---|---|---|
| 7,523,086 B1* | 4/2009 | Teague | H04L 41/0853 |
| 2005/0114686 A1* | 5/2005 | Ball | G06F 21/78 |
| | | | 713/193 |
| 2006/0106577 A1* | 5/2006 | Hatakeyama | G08B 13/2402 |
| | | | 702/183 |
| 2007/0101434 A1* | 5/2007 | Jevans | G06F 21/32 |
| | | | 726/26 |
| 2008/0189032 A1* | 8/2008 | Beadman | G01C 21/26 |
| | | | 701/532 |
| 2009/0094160 A1* | 4/2009 | Webster | G06Q 30/0254 |
| | | | 705/51 |
| 2009/0106563 A1* | 4/2009 | Cherpantier | G06F 21/86 |
| | | | 713/194 |
| 2012/0278655 A1* | 11/2012 | Lin | G06F 11/2268 |
| | | | 714/37 |

(Continued)

*Primary Examiner* — Jayesh Jhaveri
(74) *Attorney, Agent, or Firm* — Alpine Technology Law Group LLC (57) ABSTRACT

Methods and apparatus related to performance of telemetry, data gathering, and failure isolation using non-volatile memory are described. In one embodiment, a Non-Volatile Memory (NVM) controller logic stores data in a portion of an NVM device. The portion of the NVM device is determined based at least in part on a type or an identity of a sender of the data. Also, the data is encrypted in accordance with a public key provided by the sender. Other embodiments are also disclosed and claimed.

28 Claims, 6 Drawing Sheets

(56) References Cited

U.S. PATENT DOCUMENTS

| | | | |
|---|---|---|---|
| 2013/0031376 A1* | 1/2013 | Rivera et al. | 713/193 |
| 2013/0151869 A1* | 6/2013 | Steinman | G06F 1/324 |
| | | | 713/300 |
| 2013/0159733 A1* | 6/2013 | Lee et al. | 713/193 |
| 2014/0101379 A1* | 4/2014 | Tomlin | 711/103 |
| 2014/0223195 A1* | 8/2014 | Wei | 713/190 |
| 2014/0280075 A1* | 9/2014 | Huang et al. | 707/722 |
| 2014/0281545 A1* | 9/2014 | Erofeev | G06F 21/6218 |
| | | | 713/171 |
| 2015/0089249 A1* | 3/2015 | Hannon | G06F 1/3206 |
| | | | 713/300 |

* cited by examiner

PERFORMING TELEMETRY, DATA GATHERING, AND FAILURE ISOLATION USING NON-VOLATILE MEMORY

FIELD

The present disclosure generally relates to the field of electronics. More particularly, some embodiments generally relate to performing telemetry, data gathering, and failure isolation using non-volatile memory.

BACKGROUND

To improve data provision services, computer servers are continuously becoming more complex, e.g., with reliability, serviceability, and availability being the primary pillars for high-end servers. Also, it has become very important for field representatives or service engineers to be able to determine issues with servers remotely and with ease (even when a server may be deployed many miles away). Moreover, one of the main problems is obtaining data from the remote server in the most reliable fashion, so that the data may be analyzed and any issues resolved. Hence, telemetry is very important for reducing cost and obtaining data efficiently and reliably from a remote server.

Normally to tackle issues in the field and get real time data, companies have to either rely on sending field engineers to help with the issue or replace parts. Both of these options may be expensive and add to overall support cost for the company. Sometimes, a system may have a lot of debug data available which may be reviewed and used by engineers to debug a problem more efficiently and save money for the company. With more firmware agents and independent microcontrollers interacting in a large server, it is important to know which exact area is having problems so that instead of replacing the entire system, a company can replace a defective unit. For root causing, the problem debug data is required.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Some embodiments provide techniques for performing telemetry, data gathering, and failure isolation using Non-Volatile Memory (NVM) devices. In various embodiments, the NVM devices discussed herein include flash memory, Spin Torque Transfer Random Access Memory (STTRAM), Resistive Random Access Memory, 3D (3-Dimensional) Cross Point Memory such as Phase Change Memory (PCM), etc. Moreover, in one embodiment, data is stored in (and restored from) an NVM device via NVM controller logic. Since data is stored in an NVM, the stored data is persistent even after a crash or reset. The restored data is then used for resolving issues remotely. For example, a software protocol may be used to perform a handshake between an agent software/network stack and a NVM controller logic to read or write the data via the NVM controller logic.

Figure 1:
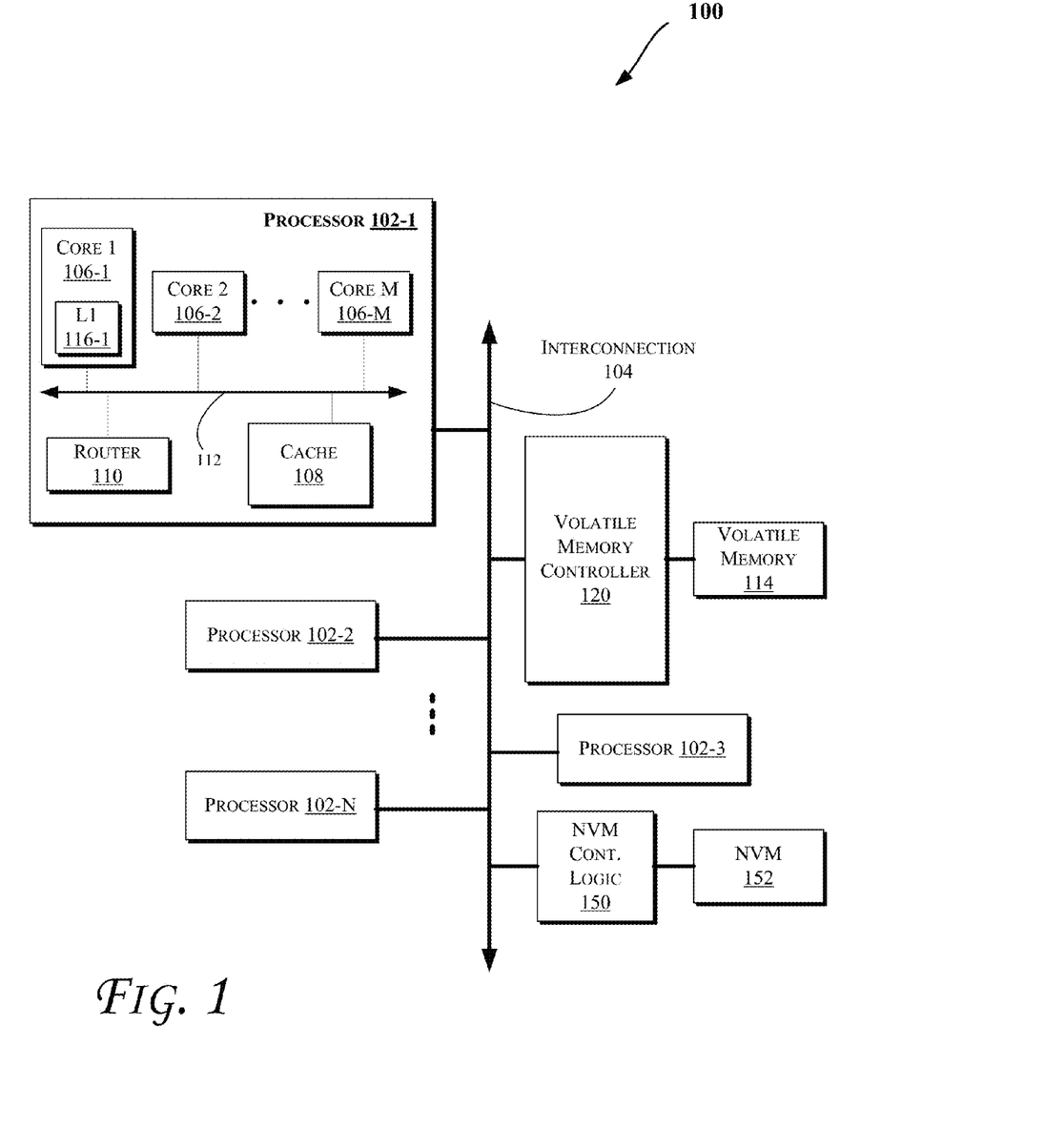
FIGS. 1, 4, 5, and 6 illustrate block diagrams of embodiments of computing systems, which may be utilized to implement various embodiments discussed herein.

Moreover, the techniques discussed herein may be provided in various computing systems such as a server, storage, or datacenters. Although some embodiments are discussed with reference to a server, techniques discussed herein may be applied to other types of computing systems (e.g., including a rack system, desktop computer, workstation, smartphone, tablet, UMPC (Ultra-Mobile Personal Computer), laptop computer, Ultrabook™ computing device, smart watch, smart glasses, etc.), such as those discussed with reference to FIGS. 1-6. More particularly, FIG. 1 illustrates a block diagram of a computing system 100, according to an embodiment. The system 100 includes one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 120, logic 150, memory controllers (such as those discussed with reference to FIGS. 4 and 5), NVM 152, or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a volatile memory 114 for faster access by the components of the processor 102. As shown in FIG. 1, the memory 114 may be in communication with the processors 102 via the interconnection 104. In an embodiment, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 1, memory 114 may be coupled to other components of system 100 through a volatile memory controller 120. System 100 also includes NVM memory controller logic 150 to couple NVM memory 152 to various components of the system 100. In an embodiment, NVM 152 and logic 150 are provided on the same integrated circuit die. Memory 152 includes non-volatile memory such as flash memory, STTRAM, Resistive Random Access Memory, 3D Cross Point Memory such as PCM, etc. in some embodiments. Even though the memory controller 150 is shown to be coupled between the interconnection 104 and the memory 152, the logic 150 may be located elsewhere in system 100. For example, logic 150 (or portions of it) may be provided within one of the processors 102, controller 120, etc. in various embodiments. Moreover, logic 150 controls access to one or more NVM devices 152 (e.g., where the one or more NVM devices are provided on the same integrated circuit die in some embodiments), as discussed herein with respect to various embodiments.

Figure 2:
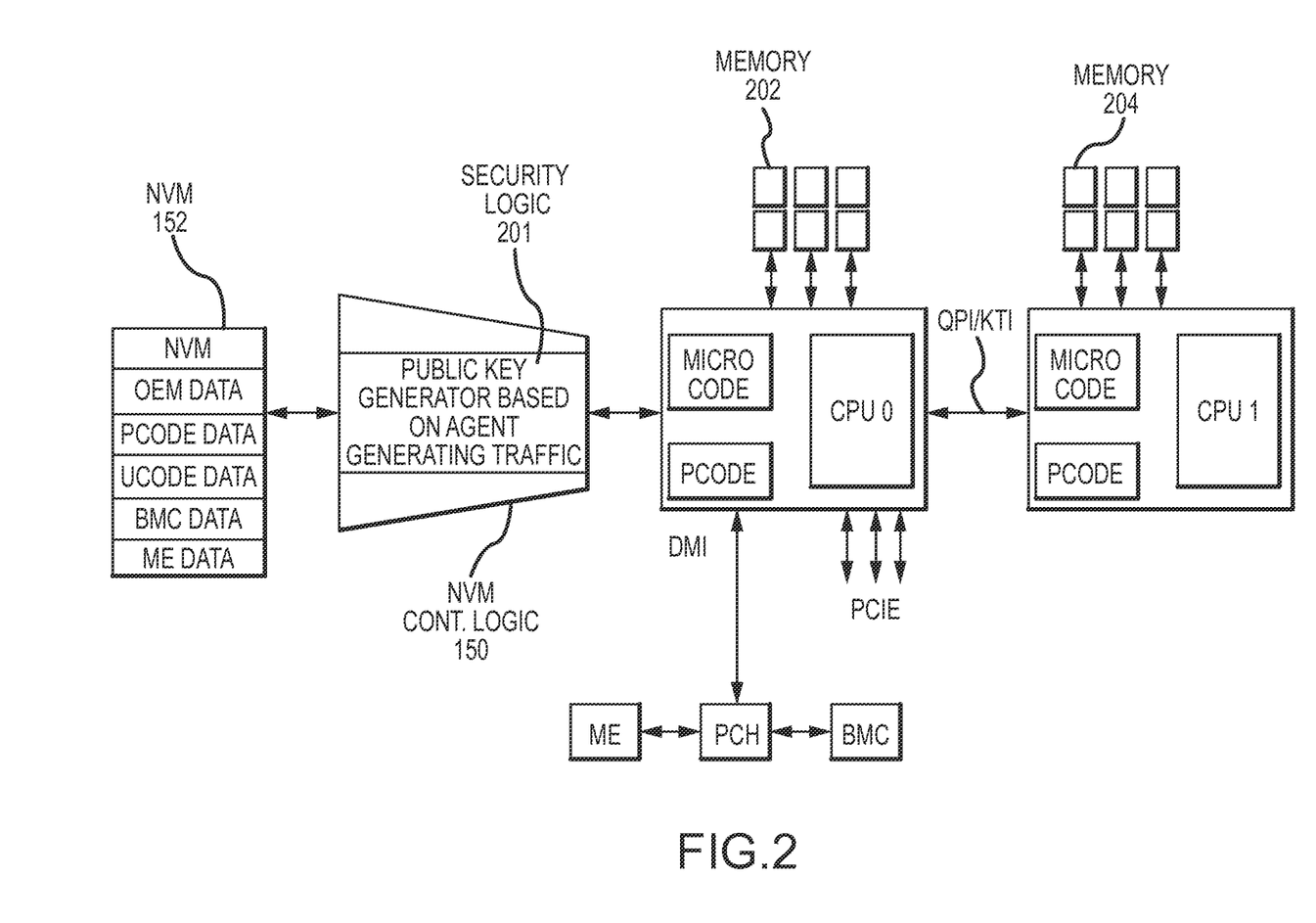
FIG. 2 is a block diagram of a system for performing telemetry, data gathering, and/or failure isolation using NVM, according to an embodiment.

FIG. 2 is a block diagram of a system 200 for performing telemetry, data gathering, and/or failure isolation using NVM, according to an embodiment. For example, system 200 may include security logic 201 (e.g., that may be provided inside the logic 150 in an embodiment) to allow for securely storage and retrieval of data for specific system components using signatures and keys. As shown, system 200 includes one or more Central Processing Units (or CPUs 0 and 1) that utilize microcode (e.g., which includes code supporting complex flows in a processor/CPU Core to implement an instruction set architecture (ISA)) and Pcode (e.g., portable code such as hardware level code to implement state machines for processor\CPU Uncore component), which may be stored in storage units (such as those discussed with reference to FIG. 1 or 4-6) on the same integrated circuit device as the CPUs. Also, the CPU0 and CPU1 may communicate via point-to-point serial links such as QPI (Quick Path Interconnect), Keizer Technology Interconnect (KTI), etc. Each CPU may have access to one or more caches (such as discussed with reference to FIG. 1) and a portion of (e.g., volatile) system memory 202/204, e.g., formed by a plurality of Dual Inline Memory Modules (DIMMs) that include dynamic random access memory (DRAM).

CPU0 and CPU1 are coupled to one or more IO (Input/Output or I/O) devices via Peripheral Component Interconnect (PCI) (or PCI express (PCIe or PCIE) interfaces). Also a DMI (Direct Media Interface) couples the CPUs to a Platform Controller Hub (PCH), and via the PCH to BMC (Baseboard Management Controller) and ME (Management Engine), which support embedded controllers and manage thermal, security, power, platform events (e.g., error(s), temperature event(s), special interrupts, etc.). In some embodiments, ME and BMC are firmware agents which may also provide diagnostics data for platform and OS to consume.

Also, while some components are only shown to be coupled to CPU0, it is envisioned that the same or similar components may be provided for other CPUs in the system (such as CPU1). As illustrated, CPU0 is coupled to the NVM 152 via the NVM controller logic 150. In various embodiments (including those discussed herein with reference to FIGS. 1-6), NVM may be provided in any location in the system as long as it is accessible per the various embodiments discussed herein. For example, NVM may be coupled to: PCIE bus (or be located on a PCIE device), a memory controller over a memory link (e.g., coupled to the memory controllers discussed herein with reference to FIGS. 1-6), PCH, a bus coupled to a processor/CPU, socket, etc. NVM may also be provided on a processor/CPU (such as those discussed with reference to FIGS. 1-6. NVM 152 may store various types of information corresponding to various components of CPU0 (and/or components coupled thereto) including one or more of OEM (Original Equipment Manufacturer), Pcode, Ucode (also referred to as microcode), BMC, ME, BIOS (Basic Input Output System), PMU (Power Management Unit), etc. Logic 150 supports public key generation, e.g., based on an agent that generates traffic/data (e.g., to be stored in NVM 152).

In an embodiment, a persistent log (e.g., stored in NVM 152) tracks a specific server which can also open up opportunities for different publishers. Specifically, the access control to the log can be configured such that third party BIOS (e.g., stored in NVM 152 and/or another NVM in the system), third party BMC/Service Processors (SP), PMU (Power Management Unit), ME, microcode, Pcode, etc. can all post to different regions in NVM 152. The NVM store can also be many-ported such that the logging can occur during the OS (Operating System) runtime from BIOS, SMM (System Management Mode, which generally refers to an operating mode that suspends normal execution (e.g., OS execution) to provides BIOS access to system, e.g., for enhancing reliability, availability, serviceability, security, power management, BMC, microcode, etc.

In addition, the privacy settings of the logging can be configured such that information is blinded in order to avoid noting a specific customer machine, e.g., instead noting a 'class of machine'. Another option is to present all of the information in an encrypted (but identifiable fashion) to the authorized entities (such as OEM or processor manufacturer) for BIOS data and/or for the microcode-sourced data, where each authorized entity may have an appropriate keying material. For example, security logic 201 may be used to encrypt data prior to storage in the NVM 152 and decrypt the stored data from the NVM 152 upon retrieval and authentication. In an embodiment, a relatively large NVM storage device may be provided such that the number of entities can grow to be very large, as opposed to some Field-Programmable Fuses (FPFs) on the die which have a limited number of settable fuses for key and/or key-hash storage.

Accordingly, some embodiments provide techniques to manage, maintain, and obtain data (including debug related and/or other essential information) from a server which can help resolve issues and/or increase product/service quality. Such embodiments allow for uniquely identifying and isolating servers, e.g., which are showing some problems (e.g. by issuing one or more error messages). Also, OEM specific unique information for the server may be saved and restored, including for example, FRU (Field Replaceable Unit) IDs (Identifiers), platform IDs, temperature, error(s), etc. This allows for knowledge regarding the status of a platform and/or clearly identify if any components have been changed and/or tampered with.

In an embodiment, the NVM controller logic 150 may communicate with other components of the system without involving the CPU (e.g., using DMA (Direct Memory Access) to an area in memory). Furthermore, in some embodiments, a fixed area in NVM 152 is used to store the debug information which then may be accessed remotely by the field service agents or other authorized entities. This data can include platform identification, platform configuration, post codes from platform, previous history (such as serial port outputs for BIOS execution), memory dumps (e.g., copying information stored in volatile memory (such as memory 202/204) to NVM 152), error logs, etc. Moreover, the information stored in the NVM 152 may be at least temporarily stored in volatile memory (such as memory 202-204) prior to storage in or retrieval from the NVM 152 in some implementations. The NVM controller logic may be used to obtain this data out of the system over a network interface to authorized entities. This data retrieval operation may be performed (e.g., by communicating with controller logic 150) either when the processor is dead or has crashed (e.g., when hardware component(s) or software (e.g., including a software application or an operation system) stop operating and/or stop performing their task(s)), may be done after a reset when the processor is back up, or during runtime.

In one embodiment, while the system is booting, certain data (e.g., pre-decided by user) may be written to the persistent memory (e.g., NVM 152). For example, when a system is booting, the debug log which is displayed during BIOS execution may be sent to the NVM to save for future use. Also, when an error occurs, the memory dump and/or error log may be saved in the NVM for later retrieval. Using this mechanism, details may be captured which can be required for active debugging of issues, such as processor debug traces and/or context information. This mechanism may also be used to track the health of a server remotely by an IT (Information Technology) administrator or solution provider.

Figure 3:
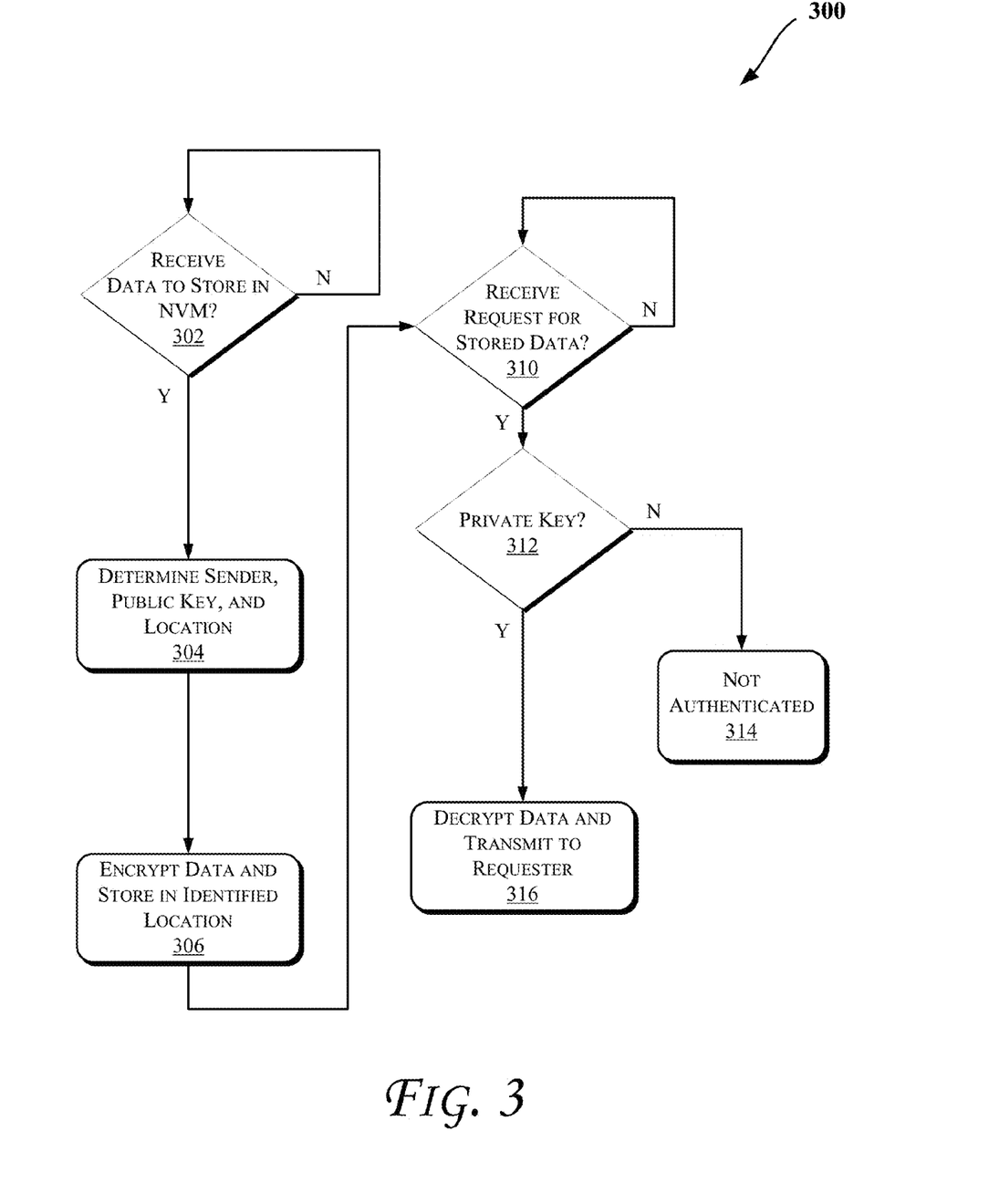
FIG. 3 illustrates a flow diagram of a method to perform telemetry, data gathering, and failure isolation using non-volatile memory, according to an embodiment.

FIG. 3 illustrates a flow diagram of a method 300 to perform telemetry, data gathering, and failure isolation using non-volatile memory, according to an embodiment. In various embodiments, one or more operations of method 300 can be performed by one or more components (such as logic 150 and/or NVM 152) discussed with reference to the other FIG. 1-2 or 4-6. In some embodiments, the NVM controller logic 150 of FIG. 1 (which may be provided on the same integrated circuit die as the NVM 152 of FIG. 1) is used to save and retrieve data.

Referring to FIGS. 1-3, at an operation 302, data is received to store in persistent memory (e.g., NVM 152). At an operation 304, once data is received, the sender identity/type, public key (e.g., provided with the data or separately), and a designated location in the NVM 152 for the identified sender are determined. As mentioned with reference to FIG. 2, there are multiple agents/components in the system (e.g., which are running) like BMC, ME, PCode, Ucode, BIOS, etc. Each of these agents may be provided with a designated area (e.g., based on the agent type or identity) to store and retrieve their data from the NVM 152. When the agent sends the data (e.g., to the processor or NVM logic 150 for storing), some logic (e.g., logic 201 or other logic in the system) may generate a public key and send it along with the data. At an operation 306, the received data is encrypted (in accordance with the public key) and stored in the identified location in NVM 152 (e.g., based on the sender's type/identity).

At an operation 310, it is determined whether a request for the stored data of operation 306 is received (e.g., at the logic 150). At an operation 312, it is determined whether a private key is provided with the request and/or whether the provided private key is correct (e.g., by attempting to decrypt the corresponding data or determining whether the private key corresponds to the public key of operation 304). If the private key is wrong or not provided, an operation 314 may handle this situation, e.g., by generating an error message, requesting a private key, etc. At an operation 316 (e.g., after determining that the correct private key is provided), the requested data is retrieved from an identified region/location (e.g., based the sender/agent type/identity) of the NVM 152 and the private key used is used to decrypt the retrieved data. Logic 150 will then transmit the decrypted data to the requester of operation 310. Software protocol for handshaking between application layer saving\retrieving the data and NVM logic 150 may handle these transactions in some embodiments.

Figure 4:
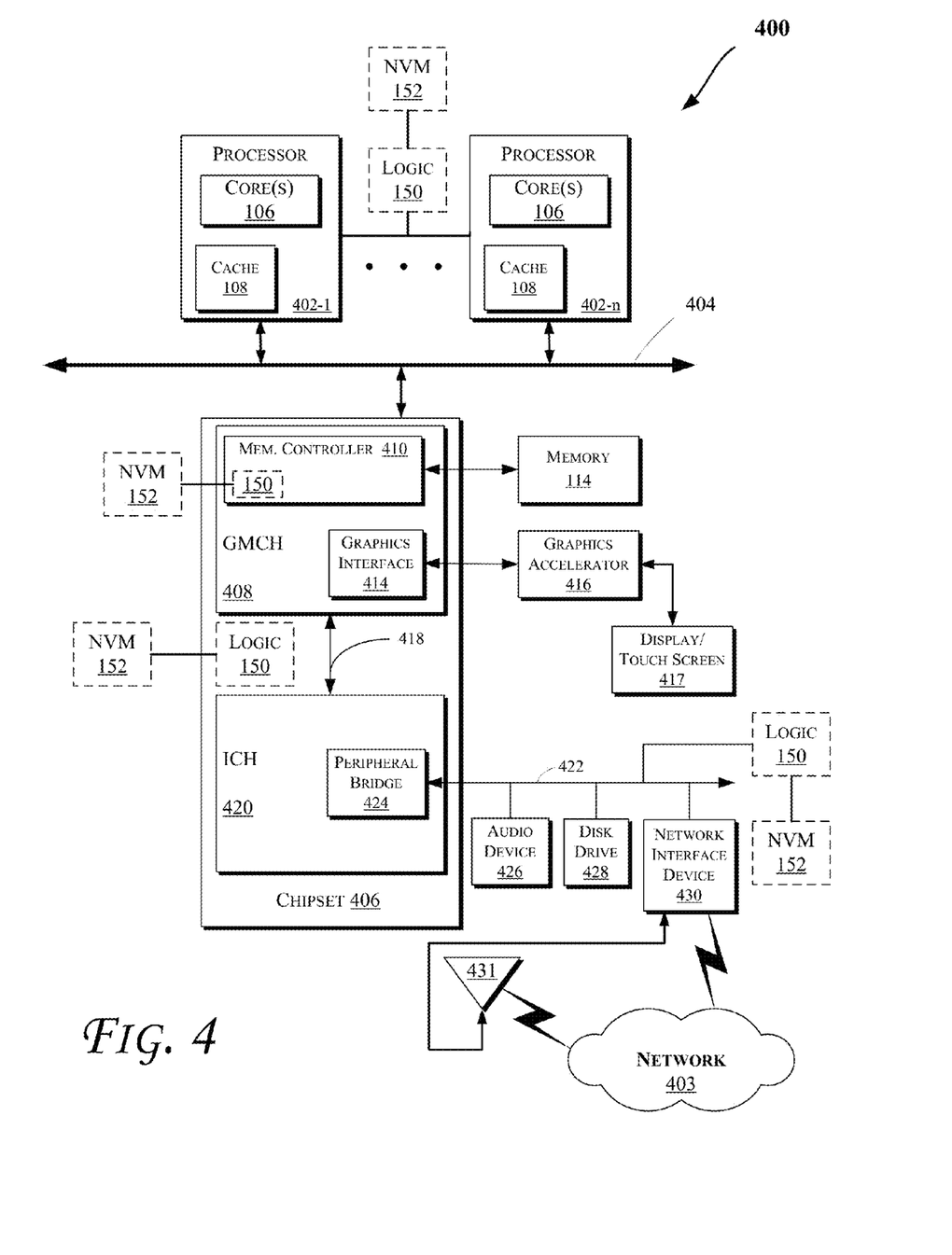

FIG. 4 illustrates a block diagram of a computing system 400 in accordance with an embodiment. The computing system 400 may include one or more central processing unit(s) (CPUs) 402 or processors that communicate via an interconnection network (or bus) 404. The processors 402 may include a general purpose processor, a network processor (that processes data communicated over a computer network 403), an application processor (such as those used in cell phones, smart phones, etc.), or other types of a processor (including a reduced instruction set computer (RISC) processor or a complex instruction set computer (CISC)). Various types of computer networks 403 may be utilized including wired (e.g., Ethernet, Gigabit, Fiber, etc.) or wireless networks (such as cellular, 3G (Third-Generation Cell-Phone Technology or 3rd Generation Wireless Format (UWCC)), 4G, Low Power Embedded (LPE), etc.). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors.

In an embodiment, one or more of the processors 402 may be the same or similar to the processors 102 of FIG. 1. For example, one or more of the processors 402 may include one or more of the cores 106 and/or cache 108. Also, the operations discussed with reference to FIGS. 1-3 may be performed by one or more components of the system 400.

A chipset 406 may also communicate with the interconnection network 404. The chipset 406 may include a graphics and memory control hub (GMCH) 408. The GMCH 408 may include a memory controller 410 (which may be the same or similar to the memory controller 120 of FIG. 1 in an embodiment) that communicates with the memory 114. System 400 may also include logic 150 (e.g., coupled to NVM 152) in various locations (such as those shown in FIG. 4 but can be in other locations within system 400 (not shown)). The memory 114 may store data, including sequences of instructions that are executed by the CPU 402, or any other device included in the computing system 400. In one embodiment, the memory 114 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk, flash, 3D Cross Point Memory (such as PCM), Resistive Random Access Memory, and STTRAM. Additional devices may communicate via the interconnection network 404, such as multiple CPUs and/or multiple system memories.

The GMCH 408 may also include a graphics interface 414 that communicates with a graphics accelerator 416. In one embodiment, the graphics interface 414 may communicate with the graphics accelerator 416 via an accelerated graphics port (AGP) or Peripheral Component Interconnect (PCI) (or PCI express (PCIe) interface). In an embodiment, a display 417 (such as a flat panel display, touch screen, etc.) may communicate with the graphics interface 414 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display 417.

A hub interface 418 may allow the GMCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403, e.g., via a wired or wireless interface). As shown, the network interface device 430 may be coupled to an antenna 431 to wirelessly (e.g., via an Institute of Electrical and Electronics Engineers (IEEE) 802.11 interface (including IEEE 802.11a/b/g/n, etc.), cellular interface, 3G, 4G, LPE, etc.) communicate with the network 403. Other devices may communicate via the bus 422. Also, various components (such as the network interface device 430) may communicate with the GMCH 408 in some embodiments. In addition, the processor 402 and the GMCH 408 may be combined to form a single chip. Furthermore, the graphics accelerator 416 may be included within the GMCH 408 in other embodiments.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
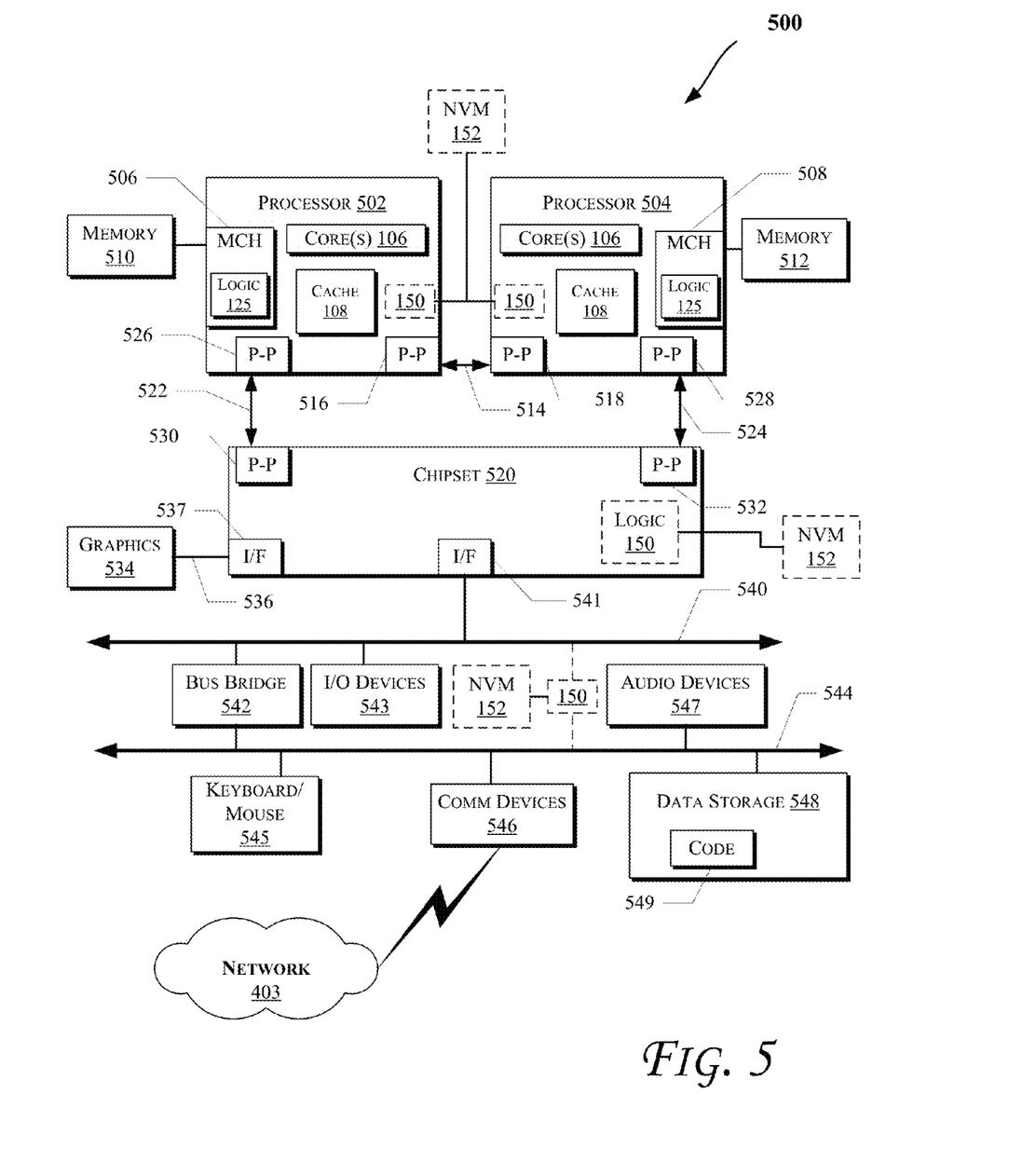

FIG. 5 illustrates a computing system 500 that is arranged in a point-to-point (PtP) configuration, according to an embodiment. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 114 or NVM 152 of FIGS. 1-2 and/or 4. Also, MCH 506 and 508 may include the memory controller 120 and/or logic 150 of FIG. 1 in some embodiments.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537. As discussed with reference to FIG. 4, the graphics interface 536 may be coupled to a display device (e.g., display 417) in some embodiments.

As shown in FIG. 5, one or more of the cores 106 and/or cache 108 of FIG. 1 may be located within the processors 502 and 504. Other embodiments, however, may exist in other circuits, logic units, or devices within the system 500 of FIG. 5. Furthermore, other embodiments may be distributed throughout several circuits, logic units, or devices illustrated in FIG. 5.

The chipset 520 may communicate with a bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403, as discussed with reference to network interface device 430 for example, including via antenna 431), audio I/O device, and/or a data storage device 548. The data storage device 548 may store code 549 that may be executed by the processors 502 and/or 504.

Figure 6:
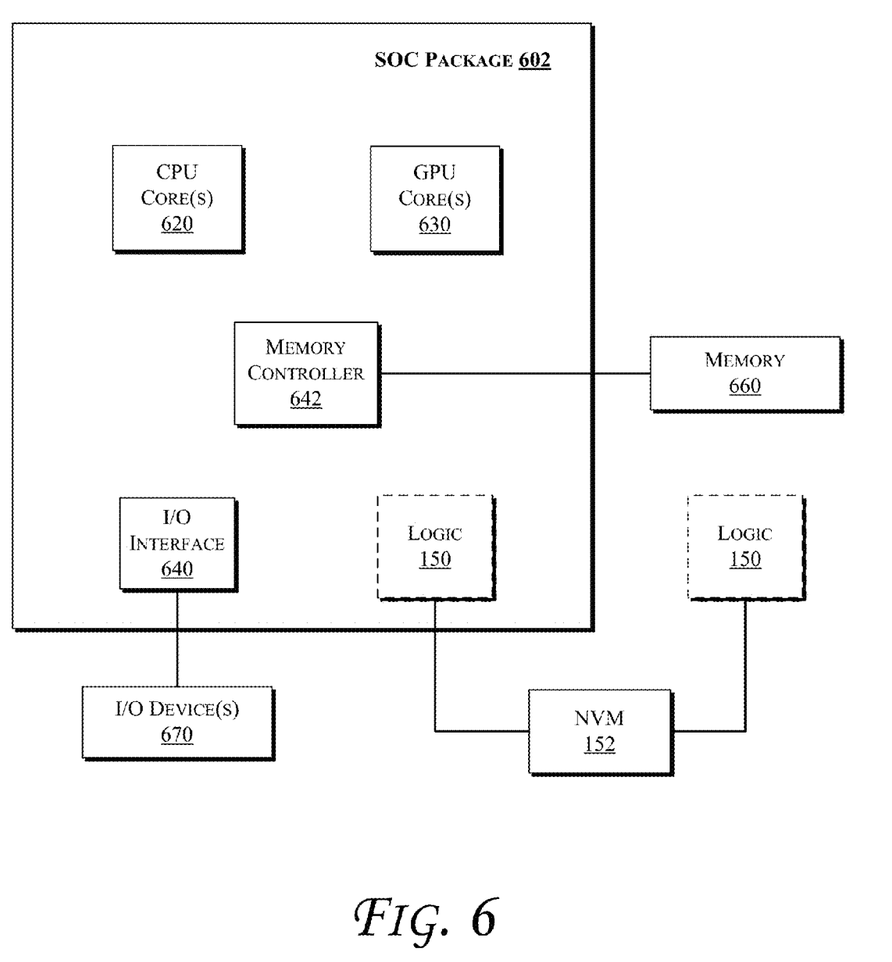

In some embodiments, one or more of the components discussed herein can be embodied as a System On Chip (SOC) device. FIG. 6 illustrates a block diagram of an SOC package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged onto a single semiconductor device.

As illustrated in FIG. 6, SOC package 602 is coupled to a memory 660 (which may be similar to or the same as memory discussed herein with reference to the other figures) via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like. Furthermore, SOC package 602 may include/integrate the logic 150 in an embodiment. Alternatively, the logic 150 may be provided outside of the SOC package 602 (i.e., as a discrete logic). Also, NVM 152 is provided outside or inside the SOC package 602 in various embodiments.

The following examples pertain to further embodiments. Example 1 includes an apparatus comprising: Non-Volatile Memory (NVM) controller logic to store data in a portion of an NVM device, wherein the portion of the NVM device is to be determined based at least in part on a type or an identity of a sender of the data, wherein the data is to be encrypted in accordance with a public key provided by the sender. Example 2 includes the apparatus of example 1, wherein the sender is to comprise a component in a computing device. Example 3 includes the apparatus of example 2, wherein the component is one of: a Power Management Unit (PMU), a Basic Input Output System (BIOS), a Baseboard Management Controller (BMC), a microcode, a Portable code (Pcode), or a Management Engine (ME). Example 4 includes the apparatus of example 1, comprising logic to encrypt the data in accordance with the public key prior to storage of the data in the portion of the NVM device. Example 5 includes the apparatus of example 1, wherein the NVM controller logic is to retrieve the stored data from the portion of the NVM device in response to a request for the data from a requester. Example 6 includes the apparatus of example 5, wherein the NVM controller logic is to decrypt the stored data and transmit the data to the requester in response to a determination that the requester has provided the private key that corresponds to the public key. Example 7 includes the apparatus of example 1, wherein the NVM controller logic is to determine whether to retrieve the stored data from the portion of the NVM device in response to a request for the data from a requester and a determination that the requester has provided a private key corresponding to the public key. Example 8 includes the apparatus of example 1, wherein the computing device is to comprise a server. Example 9 includes the apparatus of example 1, wherein the NVM controller logic is to be coupled directly to a processor, having one or more processor cores, over a memory link or a peripheral component interconnect link. Example 10 includes the apparatus of example 1, wherein the NVM device is to comprise one or more of: flash memory, 3D (3-Dimensional) Cross Point Memory, Resistive Random Access Memory, and Spin Torque Transfer Random Access Memory (STTRAM). Example 11 includes the apparatus of example 1, wherein one or more of the NVM controller logic, the NVM device, or a processor core are on a same integrated circuit die. Example 12 includes the apparatus of example 1, wherein the NVM controller logic is to be coupled directly to a Platform Controller Hub (PCH) over a link.

Example 13 includes a method comprising: storing data in a portion of an NVM device via NVM controller logic, wherein the portion of the NVM device is determined based at least in part on a type or an identity of a sender of the data, wherein the data is encrypted in accordance with a public key provided by the sender. Example 14 includes the method of example 13, wherein determining the portion of the NVM device based on the type or identity of the sender comprises determining the portion of the NVM device based at least in part on a type or an identity of a component in a computing device. Example 15 includes the method of example 14, wherein the component is one of: a Power Management Unit (PMU), a Basic Input Output System (BIOS), a Baseboard Management Controller (BMC), a microcode, a Portable code (Pcode), or a Management Engine (ME). Example 16 includes the method of example 13, further comprising encrypting the data in accordance with the public key prior to storage of the data in the portion of the NVM device. Example 17 includes the method of example 13, further comprising the NVM controller logic retrieving the stored data from the portion of the NVM device in response to a request for the data from a requester. Example 18 includes the method of example 13, further comprising the NVM controller logic determining whether to retrieve the stored data from the portion of the NVM device in response to a request for the data from a requester and a determination that the requester has provided a private key corresponding to the public key. Example 19 includes the method of example 13, further comprising coupling the NVM controller logic to a Platform Controller Hub (PCH) over a link.

Example 20 includes a computer-readable medium comprising one or more instructions that when executed on a processor configure the processor to perform one or more operations to: store data in a portion of an NVM device via NVM controller logic, wherein the portion of the NVM device is determined based at least in part on a type or an identity of a sender of the data, wherein the data is encrypted in accordance with a public key provided by the sender. Example 21 includes the computer-readable medium of example 20, further comprising one or more instructions that when executed on the processor configure the processor to perform one or more operations to cause determining the portion of the NVM device based at least in part on a type or an identity of a component in a computing device. Example 22 includes the computer-readable medium of example 21, wherein the component is one of: a Power Management Unit (PMU), a Basic Input Output System (BIOS), a Baseboard Management Controller (BMC), a microcode, a Portable code (Pcode), or a Management Engine (ME). Example 23 includes the computer-readable medium of example 20, further comprising one or more instructions that when executed on the processor configure the processor to perform one or more operations to cause encryption of the data in accordance with the public key prior to storage of the data in the portion of the NVM device. Example 24 includes the computer-readable medium of example 20, further comprising one or more instructions that when executed on the processor configure the processor to perform one or more operations to cause the NVM controller logic to retrieve the stored data from the portion of the NVM device in response to a request for the data from a requester. Example 25 includes the computer-readable medium of example 20, further comprising one or more instructions that when executed on the processor configure the processor to perform one or more operations to cause the NVM controller logic to determine whether to retrieve the stored data from the portion of the NVM device in response to a request for the data from a requester and a determination that the requester has provided a private key corresponding to the public key.

Example 26 includes a system comprising: a Non-Volatile Memory (NVM) device; a processor to access the NVM device; Non-Volatile Memory (NVM) controller logic to store data in a portion of the NVM device, wherein the portion of the NVM device is to be determined based at least in part on a type or an identity of a sender of the data, wherein the data is to be encrypted in accordance with a public key provided by the sender. Example 27 includes the system of example 26, wherein the sender is to comprise a component in a computing device. Example 28 includes the system of example 27, wherein the component is one of: a Power Management Unit (PMU), a Basic Input Output System (BIOS), a Baseboard Management Controller (BMC), a microcode, a Portable code (Pcode), or a Management Engine (ME). Example 29 includes the system of example 26, comprising logic to encrypt the data in accordance with the public key prior to storage of the data in the portion of the NVM device. Example 30 includes the system of example 26, wherein the NVM controller logic is to retrieve the stored data from the portion of the NVM device in response to a request for the data from a requester. Example 31 includes the system of example 26, wherein the NVM controller logic is to decrypt the stored data and transmit the data to the requester in response to a determination that the requester has provided the private key that corresponds to the public key. Example 32 includes the system of example 26, wherein the NVM controller logic is to determine whether to retrieve the stored data from the portion of the NVM device in response to a request for the data from a requester and a determination that the requester has provided a private key corresponding to the public key. Example 33 includes the system of example 26, wherein the computing device is to comprise a server. Example 34 includes the system of example 26, wherein the NVM controller logic is to be coupled directly to the processor, having one or more processor cores, over a memory link or a peripheral component interconnect link. Example 35 includes the system of example 26, wherein the NVM device is to comprise one or more of: flash memory, 3D (3-Dimensional) Cross Point Memory, Resistive Random Access Memory, and Spin Torque Transfer Random Access Memory (STTRAM). Example 36 includes the system of example 26, wherein one or more of the NVM controller logic, the NVM device, or a processor core are on a same integrated circuit die. Example 37 includes the system of example 26, wherein the NVM controller logic is to be coupled directly to a Platform Controller Hub (PCH) over a link.

Example 38 includes a computer-readable medium comprising one or more instructions that when executed on a processor configure the processor to perform one or more operations of any of examples 13 to 19.

Example 39 includes an apparatus comprising means for performing one or more operations of any of examples 13 to 19.

In various embodiments, the operations discussed herein, e.g., with reference to FIGS. 1-6, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-6.

Additionally, such tangible computer-readable media may be downloaded as a computer program product, wherein the program may be transferred from a remote computer (e.g., a server) to a requesting computer (e.g., a client) by way of data signals (such as in a carrier wave or other propagation medium) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
Non-Volatile Memory (NVM) controller logic, coupled to one or more processors, to store data in a portion of an NVM device,
wherein the NVM controller logic is configured to determine the portion of the NVM device based at least in part on a type or an identity of a sender of the data, wherein the data is encrypted in accordance with a public key provided by the sender, wherein the encrypted data is accessible remotely by an authorized entity, wherein the data stored in the portion of the NVM device comprises log data utilized for a subsequent debug operation, wherein the sender comprises a component in a computing device, wherein the component is a Power Management Unit (PMU) that controls one or more power functions of the computing device.

2. The apparatus of claim 1, wherein the component is the PMU or one of: a Basic Input Output System (BIOS), a Baseboard Management Controller (BMC), a microcode, a Portable code (Pcode), or a Management Engine (ME).

3. The apparatus of claim 1, comprising logic to encrypt the data in accordance with the public key prior to storage of the data in the portion of the NVM device.

4. The apparatus of claim 1, wherein the NVM controller logic is to retrieve the stored data from the portion of the NVM device in response to a request for the data from a requester.

5. The apparatus of claim 4, wherein the NVM controller logic is to decrypt the stored data and transmit the data to the requester in response to a determination that the requester has provided a private key that corresponds to the public key.

6. The apparatus of claim 1, wherein the NVM controller logic is to determine whether to retrieve the stored data from the portion of the NVM device in response to a request for the data from a requester and a determination that the requester has provided a private key corresponding to the public key.

7. The apparatus of claim 1, wherein the sender is to comprise a component in a computing device, wherein the computing device is to comprise a server.

8. The apparatus of claim 1, wherein the NVM controller logic is to be coupled directly to a processor, having one or more processor cores, over a memory link or a peripheral component interconnect link.

9. The apparatus of claim 1, wherein the NVM device is to comprise one or more of: flash memory, 3D (3-Dimensional) Cross Point Memory, Resistive Random Access Memory, and Spin Torque Transfer Random Access Memory (STTRAM).

10. The apparatus of claim 1, wherein one or more of the NVM controller logic, the NVM device, or a processor core are on a same integrated circuit die.

11. The apparatus of claim 1, wherein the NVM controller logic is to be coupled directly to a Platform Controller Hub (PCH) over a link.

12. A method comprising:
storing data in a portion of an NVM device via NVM controller logic, wherein the NVM controller logic is coupled to one or more processors,
wherein the NVM controller logic determines the portion of the NVM device based at least in part on a type or an identity of a sender of the data, wherein the data is encrypted in accordance with a public key provided by the sender, wherein the encrypted data is accessible remotely by an authorized entity, wherein the data stored in the portion of the NVM device comprises log data utilized for a subsequent debug operation, wherein determining the portion of the NVM device based on the type or identity of the sender comprises determining the portion of the NVM device based at least in part on a type or an identity of a component in a computing device wherein the component is a Power Management Unit (PMU) that controls one or more power functions of the computing device.

13. The method of claim 12, wherein the component is the PMU or one of: a Basic Input Output System (BIOS), a Baseboard Management Controller (BMC), a microcode, a Portable code (Pcode), or a Management Engine (ME).

14. The method of claim 12, further comprising encrypting the data in accordance with the public key prior to storage of the data in the portion of the NVM device.

15. The method of claim 12, further comprising the NVM controller logic retrieving the stored data from the portion of the NVM device in response to a request for the data from a requester.

16. The method of claim 12, further comprising the NVM controller logic determining whether to retrieve the stored data from the portion of the NVM device in response to a request for the data from a requester and a determination that the requester has provided a private key corresponding to the public key.

17. The method of claim 12, further comprising coupling the NVM controller logic to a Platform Controller Hub (PCH) over a link.

18. A non-transitory computer-readable medium comprising one or more instructions that when executed on a processor configure the processor to perform one or more operations to:
store data in a portion of an NVM device via NVM controller logic, wherein the NVM controller logic is coupled to one or more processors,
wherein the NVM controller logic is configured to determine the portion of the NVM device based at least in part on a type or an identity of a sender of the data, wherein the data is encrypted in accordance with a public key provided by the sender, wherein the encrypted data is accessible remotely by an authorized entity, wherein the data stored in the portion of the NVM device comprises log data utilized for a subsequent debug operation, wherein the portion of the NVM device is determined based at least in part on a type or an identity of a component in a computing device, wherein the component is a Power Management Unit (PMU) that controls one or more power functions of the computing device.

19. The non-transitory computer-readable medium of claim 18, wherein the component is the PMU or one of: a Basic Input Output System (BIOS), a Baseboard Management Controller (BMC), a microcode, a Portable code (Pcode), or a Management Engine (ME).

20. The non-transitory computer-readable medium of claim 18, further comprising one or more instructions that when executed on the processor configure the processor to perform one or more operations to cause encryption of the data in accordance with the public key prior to storage of the data in the portion of the NVM device.

21. The non-transitory computer-readable medium of claim 18, further comprising one or more instructions that when executed on the processor configure the processor to perform one or more operations to cause the NVM controller logic to retrieve the stored data from the portion of the NVM device in response to a request for the data from a requester.

22. The non-transitory computer-readable medium of claim 18, further comprising one or more instructions that when executed on the processor configure the processor to perform one or more operations to cause the NVM controller logic to determine whether to retrieve the stored data from the portion of the NVM device in response to a request for the data from a requester and a determination that the requester has provided a private key corresponding to the public key.

23. The apparatus of claim 1, wherein the encrypted data is to be accessible after a crash or reset.

24. The apparatus of claim 1, wherein the log data is to comprise memory dump data, wherein the memory dump data is to be generated in response to occurrence of an error.

25. The apparatus of claim 1, wherein the log data is to comprise debug log data that is displayed during BIOS execution.

26. The apparatus of claim 1, wherein the log data is to comprise context information or processor debug traces.

27. The apparatus of claim 1, wherein the NVM is to be many-ported to allow logging during runtime from System Management Mode (SMM).

28. The apparatus of claim 27, wherein the SMM is to comprise an operating mode that suspends normal execution to provide BIOS access to system during runtime.

* * * * *